United States Patent [19]

Röker et al.

[11] 4,254,812
[45] Mar. 10, 1981

[54] PNEUMATIC VEHICLE TIRE

[75] Inventors: Klaus-Dieter Röker, Garbsen; Wolfgang Pehl, Seelze; Diethelm Reichenbach, Langenhagen, all of Fed. Rep. of Germany

[73] Assignee: Continental Gummi-Werke Aktiengesellschaft, Hanover, Fed. Rep. of Germany

[21] Appl. No.: 61,426

[22] Filed: Jul. 27, 1979

Related U.S. Application Data

[63] Continuation of Ser. No. 868,290, Jan. 10, 1978, abandoned.

[30] Foreign Application Priority Data

Jan. 12, 1977 [DE] Fed. Rep. of Germany ....... 2700965

[51] Int. Cl.$^3$ .......................... B60C 11/00; C09K 3/14
[52] U.S. Cl. ...................................... 152/211; 106/36; 156/114
[58] Field of Search ............... 152/210, 211, 212, 208, 152/167, 168, 169, 222; 156/114; 106/36

[56] References Cited

U.S. PATENT DOCUMENTS

| | | | |
|---|---|---|---|
| 2,675,047 | 4/1954 | Andy | 152/211 |
| 2,806,502 | 9/1957 | Andy | 152/211 |
| 4,082,131 | 4/1978 | Scheller | 152/210 |

*Primary Examiner*—John T. Goolkasian
*Assistant Examiner*—Thomas Bokan
*Attorney, Agent, or Firm*—Becker & Becker, Inc.

[57] ABSTRACT

A pneumatic vehicle tire with a tread strip having wood powder embedded therein and through the tread strip in the form of particles having a size within the range of from about 0.02 to 0.25 mm (mesh width of from 20 to 250$\mu$ according to German Standards DIN 4188). The wood particles are directly connected to and embedded in the tread strip mixture of which tread strip is made, e.g. rubber mixture, without the employment of adhesives. The wood particles amount to about from 2 to 10% by weight of the tread strip mixture.

1 Claim, 1 Drawing Figure

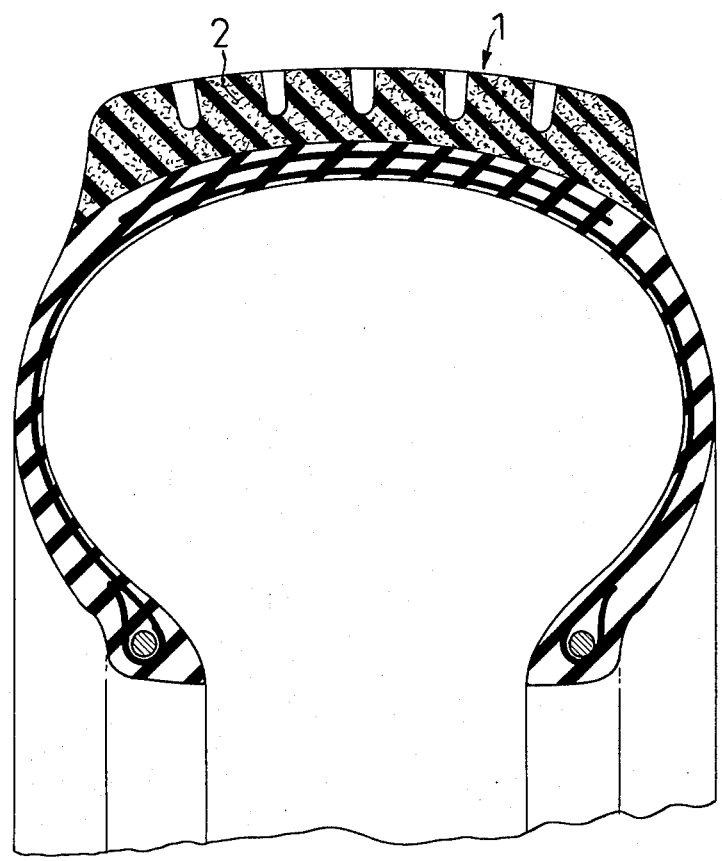

PNEUMATIC VEHICLE TIRE

This is a continuation of application Ser. No. 868,290, filed Jan. 10, 1978, now abandoned.

The present invention relates to a pneumatic vehicle tire with a tread strip treated to increase its slide resistance.

It is known to incorporate in the tread strip of a tire certain substances which adhere to the material of the tire and due to their hardness and friction increase the grasp of the tire. These particles detach themselves from the tread strip texture when they reach the tread surface of the tire.

It is an object of the present invention to provide a pneumatic vehicle tire in which the material of the tread strip will have intermixed therewith an inexpensive substance which will greatly increase the roughness of the tread strip surface and bring about a micro-profile of the tread strip to increase the slide resistance of the tire.

These and other objects and advantages of the invention will appear more clearly from the following specification in connection with the accompanying drawing showing a fragmentary cross section through a tire with the particles according to the invention embedded therein.

The problem underlying the present invention has been solved according to the present invention by admixing wood powder to the substance of the tread strip, the particles of said wood powder having a magnitude of from about 0.02 to 0.25 mm screen mesh from 20 to 250$\mu$ according to German Standards D.I.N. 4188. The powder particles stick to the tread strip mixture without the employment of adhesives, and the proportion of the wood powder admixed to the substance of the tread strip amount to from about 2 to 10% by weight of the rubber mixture of the tread strip. Particularly satisfactory results are obtained when the proportion of the powder amounts to about 5% by weight of the rubber mixture of the tread strip, and when the size of the powder particles is within the range of from 0.1 to 0.2 mm, preferably from about 0.2 to 0.16 mm. Referring now to the drawing in detail, the tire shown therein comprises the usual carcass with inserts and beads and has a customary tread strip 1 which in conformity with the present invention has embedded therein wood powder, especially advantageously of wood from pine, spruce or fir, in other words, soft wood particles designated with the reference numeral 2.

The present invention is based on the finding that the friction of the tire on an icy road surface depends greatly on the surface structure of the tread strip mixture. The friction coefficients are directly proportional to the surface roughness of the tire. Tests have proved that the above mentioned wood particles particularly satisfactorily result in a favorable and reproducible adjustment of the surface roughness of the tread strip. The admixture according to the present invention brings about a very uniform relatively fine roughness of the tread strip which merely changes the surface structure of the mixture but not the characteristics of the tread strip profile. This relatively slight roughness also brings about that the relative faster wear which has been observed with coarser admixture of other particles is avoided with the admixture of the wood powder according to the invention. The rough surface of the tread strip obtained by the present invention, even though it is frequently not noticeable by the naked eye results in an improvement of the frictional coefficient on ice by about 20%. The tire with a tread strip according to the present invention can therefore justifiably be called an "ice tire".

In view of the finely ground wood powder and the fact that during the grinding irregularly shaped particles are obtained, automatically a corresponding irregular roughening of the tread strip surface is obtained.

For purposes of realizing the above results of the tire according to the invention, it is not necessary under all circumstances that the larger portion or all particles of the wood powder admixture detach themselves from the tread strip. The roughened surface will also be obtained because the mechanical anchoring of the wood particles in the rubber substance of the tread strip is maintained when already sections of the individual particles are worn off. In view of the properties of the wood, also in this connection a sufficiently high degree of roughness is obtained which increases the friction coefficient.

It is, of course, to be understood that the present invention is by no means limited to the specific showing in the drawing, but also comprises any modifications within the scope of the appended claims.

What we claim is:

1. A pneumatic vehicle tire comprising in combination a tread strip having wood powder particles embedded therein and finely distributed throughout to assure against skidding and sliding of the tread strip upon ice due to improvement in frictional coefficient on ice, said wood powder particles having a size in a range of from 0.12 to 0.16 mm., said wood powder particles constituting about 5% by weight of the tread strip mixture being directly compounded with the tread strip mixture in an amount ranging from 2% to 10% by weight of the mixture of which said tread strip is made.

* * * * *